(12) United States Patent
Guo

(10) Patent No.: US 8,001,312 B2
(45) Date of Patent: Aug. 16, 2011

(54) CIRCUIT BOARD SYSTEM

(75) Inventor: Li-Wen Guo, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 64 days.

(21) Appl. No.: 12/476,740

(22) Filed: Jun. 2, 2009

(65) Prior Publication Data

US 2010/0169530 A1    Jul. 1, 2010

(30) Foreign Application Priority Data

Dec. 26, 2008    (CN) .................. 2008 2 0303771 U

(51) Int. Cl.
*H05K 7/10* (2006.01)
*G06F 1/26* (2006.01)
*G06F 1/00* (2006.01)

(52) U.S. Cl. ........ 710/301; 710/300; 710/302; 713/300; 713/310; 713/320; 713/324

(58) Field of Classification Search .................. 710/300, 710/301, 302; 713/300, 310, 320, 321, 322, 713/323, 324, 330, 340
See application file for complete search history.

(56) References Cited

U.S. PATENT DOCUMENTS

| | | | | |
|---|---|---|---|---|
| 5,519,851 | A * | 5/1996 | Bender et al. | 710/301 |
| 5,613,130 | A * | 3/1997 | Teng et al. | 713/300 |
| 5,930,496 | A * | 7/1999 | MacLaren et al. | 703/23 |
| 6,052,742 | A * | 4/2000 | Kirinaka et al. | 710/10 |
| 6,362,980 | B1 * | 3/2002 | Ohashi et al. | 363/21.01 |
| 6,697,883 | B1 * | 2/2004 | Jinnouchi | 710/14 |
| 6,976,112 | B2 * | 12/2005 | Franke et al. | 710/302 |
| 7,536,484 | B1 * | 5/2009 | Felton | 710/8 |
| 7,607,579 | B2 * | 10/2009 | Yoshida | 235/435 |

* cited by examiner

*Primary Examiner* — Brian Misiura
(74) *Attorney, Agent, or Firm* — D. Austin Bonderer

(57) ABSTRACT

A circuit board system for connecting with at least an expansion card that includes a Programmable Logic Device (PLD) electrically coupled to the expansion slot. The PLD is configured to detect whether the expansion card is compatible with the circuit board system. If the PLD detects that the expansion card is not compatible with the circuit board system, the logic controller cuts off the connection between the main power supply and the expansion slot.

8 Claims, 3 Drawing Sheets

CIRCUIT BOARD SYSTEM

BACKGROUND

1. Technical Field

The present disclosure relates to a circuit board system for connecting with expansion cards.

2. Description of Related Art

On a typical motherboard, an I/O (Input/output) chipset controls communications between the CPU and different peripheral components, such as expansion cards, and so on. An expansion card is inserted in an expansion slot to connect to the motherboard. However, the expansion card can only be inserted in a special expansion slot with the same specification. If the expansion card is inserted in an expansion slot of a different specification, the expansion card or the motherboard may be damaged when power is turned on.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
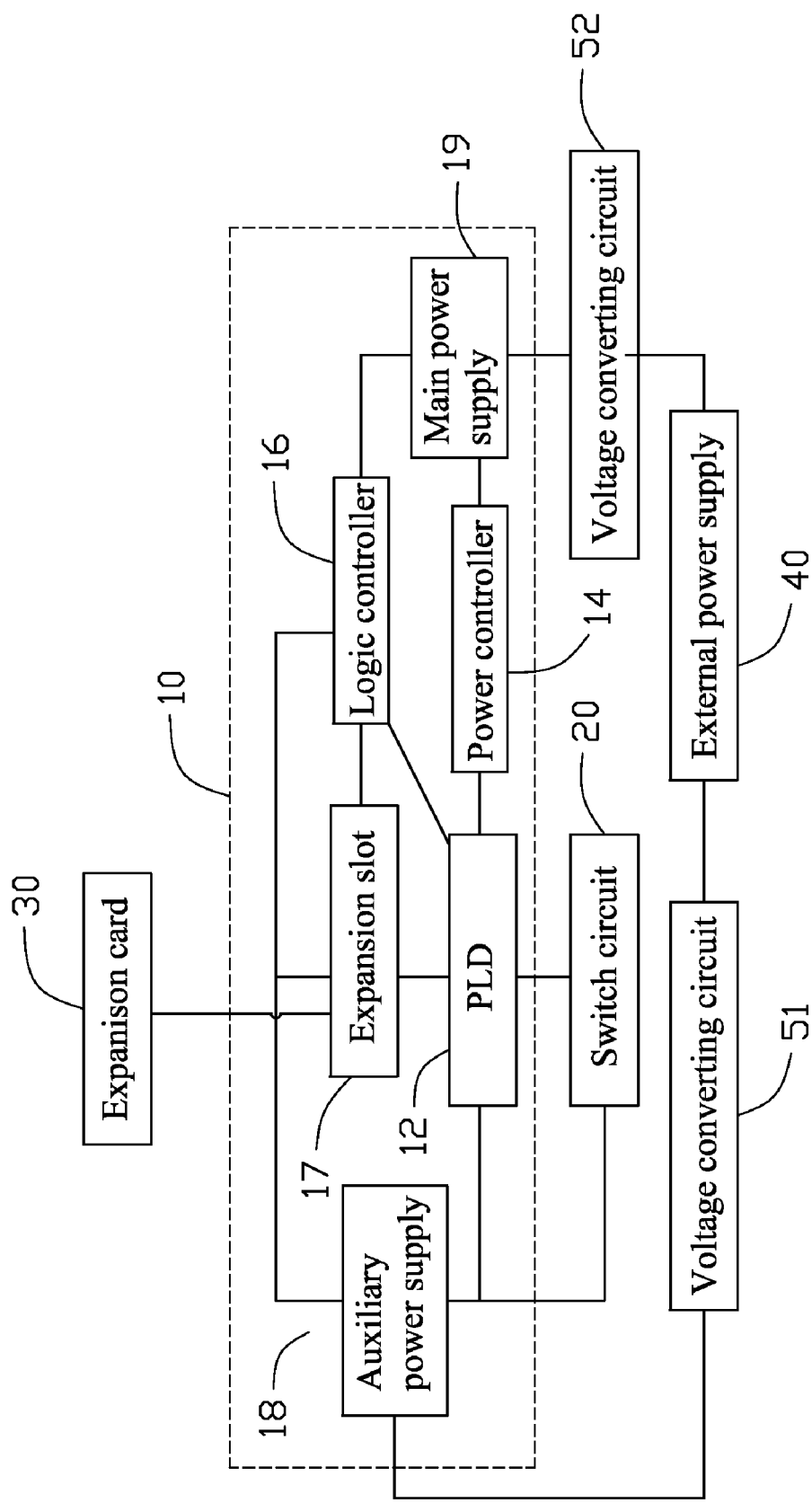
FIG. 1 is a block diagram of an embodiment of a circuit board system for connecting with expansion cards.

FIG. 1 is a block diagram of an embodiment of a circuit board system 10 for connecting with an expansion card 30. The circuit board system 10 includes a Programmable Logic Device (PLD) 12, a power controller 14, a logic controller 16, an auxiliary power supply 18, a main power supply 19, and an expansion slot 17 for connecting with the expansion card 30. The expansion card 30 includes a present code, and an ID code. The present code indicates whether the expansion card 30 inserted in the expansion slot 17 is compatible with the expansion slot 17. The ID code indicates a serial number of the expansion card 30, which includes a plurality of voltage level signals. In the present embodiment, the expansion card 30 can be a riser card, or a graphic card, and so on.

The PLD 12 is electrically coupled to the expansion slot 17, the logic controller 16, and a switch circuit 20. The PLD 12 is electrically coupled to the main power 19 via the power controller 14. The PLD 12 stores a plurality of expansion card ID codes of different expansion cards, which can well work with the circuit board system 10. The PLD 12 detects the present code and the ID code of the expansion card 30, compares the detected ID code with the stored expansion card ID codes, and outputs corresponding signals to the power controller 14 and logic controller 16 according to the comparison result. The auxiliary power supply 18 is electrically coupled to the switch circuit 20, the PLD 12, the expansion slot 17, and the logic controller 16 for providing auxiliary power. The auxiliary power supply 18 and the main power supply 19 are electrically coupled to an external power source 40 via two voltage converting circuits 51, 52 respectively. In the present embodiment, the external power source 40 provides AC power.

Figure 2A:
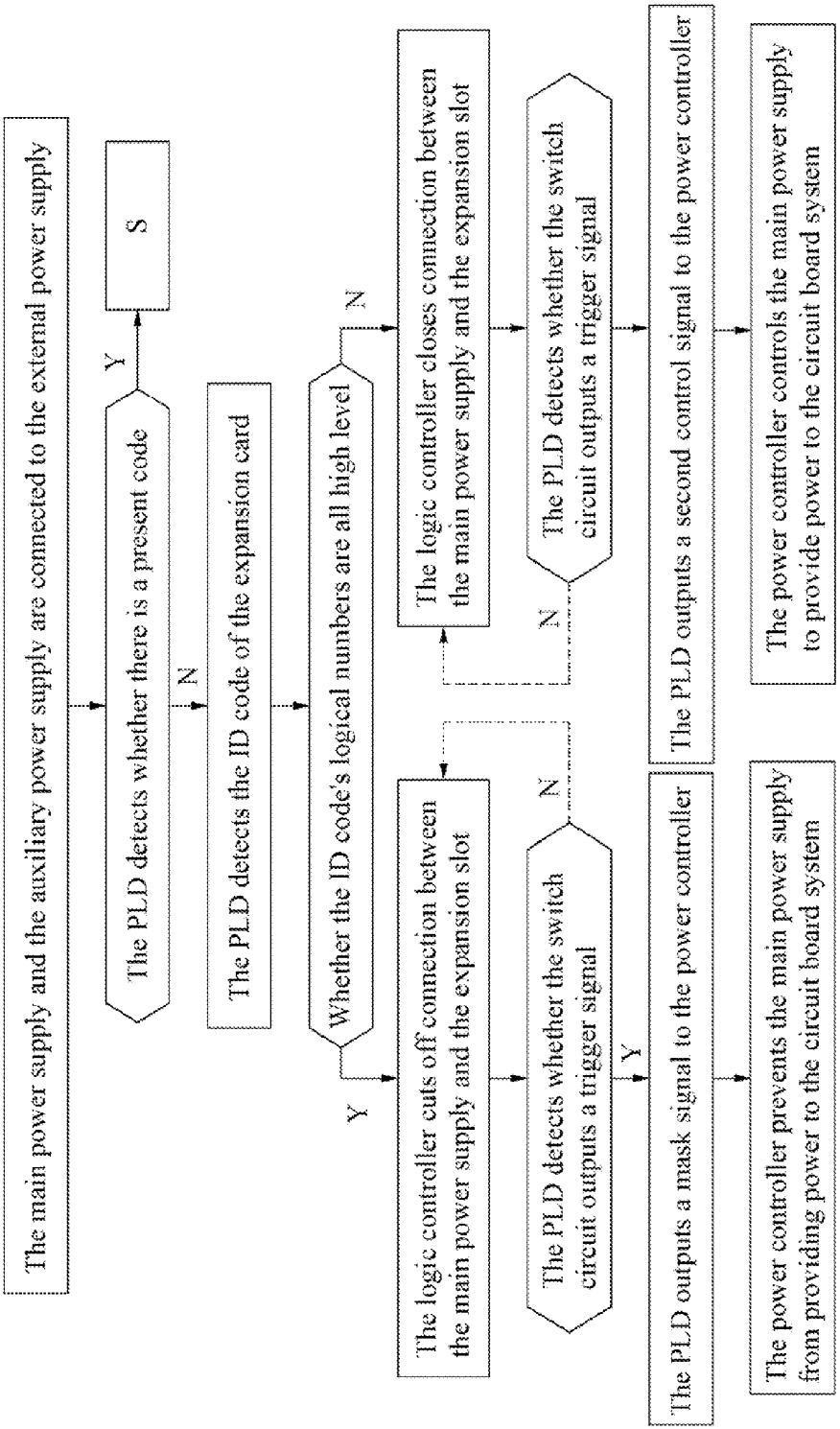
FIG. 2 is a flow chart of connecting an expansion card to the circuit board system of FIG. 1.
Figure 2B:
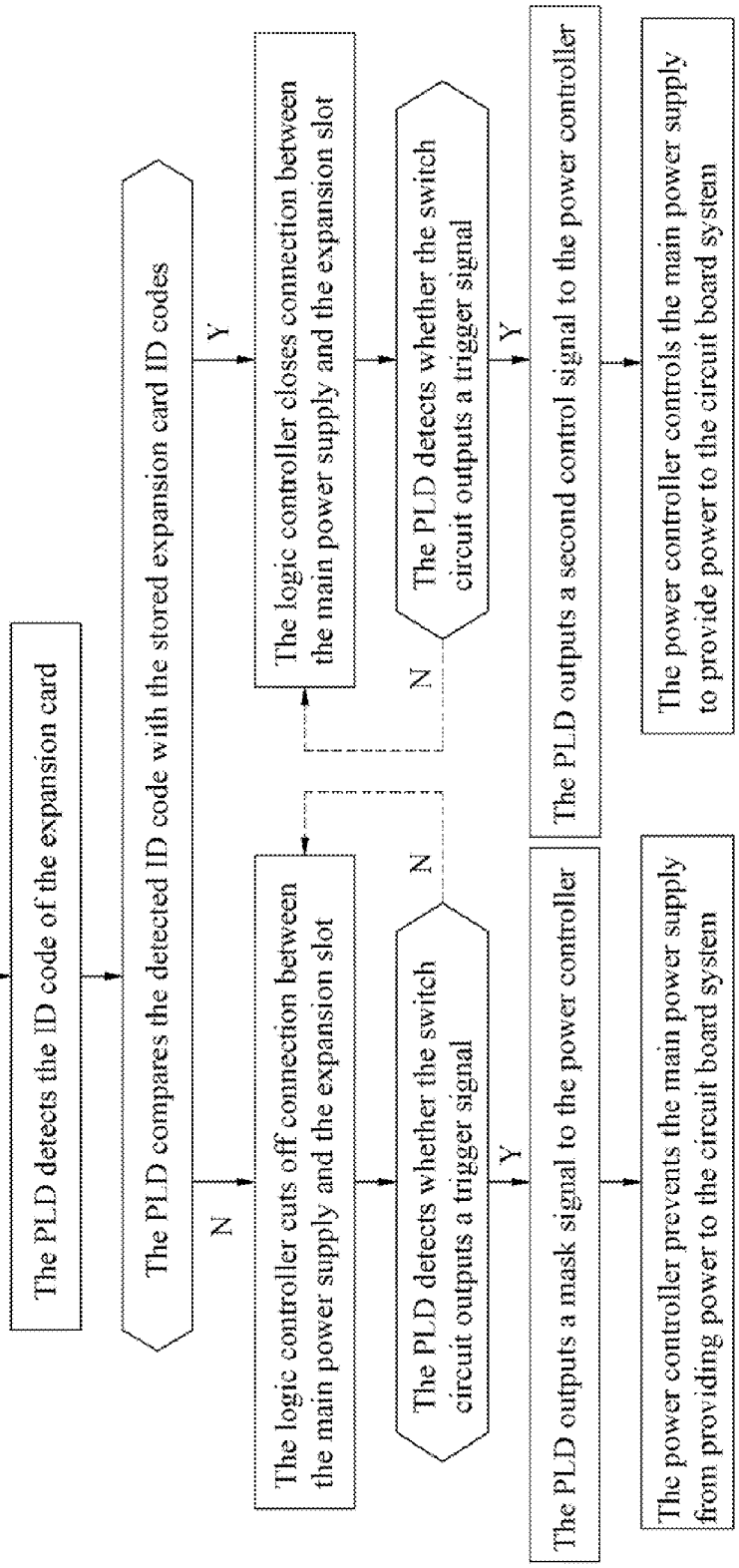

Referring to FIG. 2, after the expansion card 30 is inserted in the expansion slot 17, the circuit board system 10 is powered on by the external power source 40 providing power to the main power supply 19 and the auxiliary power supply of the circuit board system 10. The PLD 12 detects the present code of the expansion card 30 via the expansion slot 17.

If the present code of the expansion card 30 cannot be detected by the PLD 12, the expansion card 30 is not compatible with the expansion slot 17, then the PLD 12 further detects the ID code of the expansion card 30.

If the detected ID code's logical numbers are all high voltage level, there is no expansion card inserted in the expansion slot 17. The PLD 12 outputs a first control signal to the logic controller 16. The logic controller 16 cuts off the connection between the main power 19 and the expansion slot 17. At the same time, the PLD 12 detects whether the switch circuit 20 outputs a trigger signal. If the switch circuit 20 does not output the trigger signal, the PLD 12 keeps detecting; if the switch circuit 20 outputs the trigger signal, the PLD 12 outputs a second control signal to the power controller 14, the power controller 14 controls the main power supply 19 to provide power to the circuit board system 10.

If the detected ID code's logical numbers are not all high voltage level, the expansion card 30 inserted in the expansion slot 17 is not compatible with the circuit board system 10. The PLD 12 outputs the first control signal to the logic controller 16. The logic controller 16 cuts off the connection between the main power supply 19 and the expansion slot 17. At the same time, the PLD 12 detects whether the switch circuit 20 outputs a trigger signal. If the switch circuit 20 does not output the trigger signal, the PLD 12 keeps detecting; if the switch circuit 20 outputs the trigger signal, the PLD 12 outputs a mask signal to the power controller 14, and the power controller 14 prevents the main power supply 19 from providing power to the circuit board system 10.

If the present code of the expansion card 30 can be detected by the PLD 12, the expansion card 30 is compatible with the expansion slot 17, the PLD 12 further detects the ID code of the expansion card 30, and compares the detected ID code with the stored expansion card ID codes.

If the detected ID code matches with one of the stored expansion card ID codes, the expansion card 30 inserted in the expansion slot 17 is compatible with the circuit board system 10. The PLD 12 outputs a third control signal to the logic controller 16. The logic controller 16 closes the connection between the main power supply 19 and the expansion slot 17. At the same time, the PLD 12 detects whether the switch circuit 20 outputs a trigger signal. If the switch circuit 20 does not output the trigger signal, the PLD 12 keeps detecting; if the switch circuit 20 outputs the trigger signal, the PLD 12 outputs a second control signal to the power controller 14, and the power controller 14 prevents the main power supply 19 from providing power to the circuit board system 10.

If the detected ID code does not match with one of the stored expansion card ID codes, the expansion card 30 inserted in the expansion slot 17 is not is compatible with the circuit board system 10. The PLD 12 outputs the first control signal to the logic controller 16. The logic controller 16 cuts off the connection between the main power supply 19 and the expansion slot 17. At the same time, the PLD 12 detects whether the switch circuit 20 outputs a trigger signal. If the switch circuit 20 does not output the trigger signal, the PLD 12 keeps detecting; if the switch circuit 20 outputs the trigger signal, the PLD 12 outputs the mask signal to the power controller 14, and the power controller 14 prevents the main power supply 19 from providing power to the circuit board system 10.

Before the main power supply 19 provides power to the circuit board system 10, the PLD 12 of the circuit board system 10 detects whether there is an expansion card 30 inserted in the expansion slot 17, and if there is, whether it is compatible with the expansion slot 17. When the expansion card 30 is not compatible with the expansion slot 17, the PLD 12 controls the logic controller 16 to cut the connection between the main power supply 19 and the expansion slot 17. Therefore the expansion card 30 and the circuit board system 10 are protected from being damaged.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A circuit board system for connecting with at least an expansion card, comprising:
   at least an expansion slot for connecting with the expansion card;
   a Programmable Logic Device (PLD) electrically coupled to the expansion slot; configured to detect whether the expansion card is compatible with the circuit board system, and outputting a detecting result;
   a logic controller coupled to the expansion slot and the PLD; and
   a main power supply electrically coupled to the expansion slot via the logic controller;
   wherein when the PLD detects that the expansion card is not compatible with the circuit board system, the logic controller cuts off the connection between the main power supply and the expansion slot;
   the expansion card comprises a present code and ID code, the PLD stores a plurality of expansion card ID codes of different expansion cards which can work with the circuit board system; and
   the PLD is configured to detect the ID code of the expansion card, and compare the ID code with the stored expansion card ID codes to determine whether the expansion card is compatible with the circuit board system;
   wherein the PLD is configured to output a control signal to the power controller to control the main power supply to provide power to the circuit board system after receiving a trigger signal if the ID code's logical numbers are all high voltage level.

2. The circuit board system of claim 1, further comprising a power controller electrically coupled between the PLD and the main power supply for controlling the main power supply.

3. The circuit board system of claim 2, further comprising a switch circuit electrically coupled to the PLD, and capable of outputting a trigger signal to the PLD.

4. The circuit board system of claim 3, further comprising an auxiliary power supply electrically coupled to the switch circuit, the PLD, the expansion slot, and the logic controller respectively.

5. The circuit board system of claim 4, further comprising an external power supply, a first voltage converting circuit, and a second voltage converting circuit;
   the external power supply is electrically coupled to the main power supply and the auxiliary power supply via the first and second voltage converting circuit respectively.

6. A method for detecting expansion cards connected with expansion slots on a circuit board system, the method comprising the following steps:
   the circuit board system being powered on by connecting a main power supply and an auxiliary power supply thereon with an external power supply;
   providing a Programmable Logic Device (PLD) configured to detect a present code of the expansion card connected with the corresponding expansion slot;
   if the present code of the expansion card can not be detected by the PLD, the PLD outputs a first control signal to a logic controller, the logic controller cuts off the connection between the main power supply and the expansion slot;
   if the present code of the expansion card can be detected by the PLD, the PLD further detects an ID code of the expansion card, and compares the detected ID code with the a plurality of stored expansion card ID codes to determine whether the expansion card is compatible with the circuit board system;
   wherein when the detected ID code does not match with one of the stored expansion card ID codes, the PLD outputs the first control signal to the logic controller, the logic controller cuts off the connection between the main power supply and the expansion slot; and when the detected ID code does not match with one of the stored expansion card ID codes, the PLD further outputs a mask signal to the power controller to prevent the main power supply from providing power to the circuit board system after receiving a trigger signal.

7. The method of claim 6, wherein if the detected ID code matches with one of the stored expansion card ID codes, the PLD outputs a third control signal to the logic controller, the logic controller closes the connection between the main power supply and the expansion slot.

8. The circuit board system of claim 1, wherein the PLD is configured to ouput a mask signal to the power controller to prevent the main power supply from providing power to the circuit board system after receiving a trigger signal if the ID code's logical numbers are not all high voltage level.

* * * * *